United States Patent
Persico

(10) Patent No.: US 7,702,370 B2
(45) Date of Patent: Apr. 20, 2010

(54) GPS POSITION TRACKING METHOD WITH VARIABLE UPDATING RATE FOR POWER CONSERVATION

(75) Inventor: Charles J. Persico, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 794 days.

(21) Appl. No.: 11/083,419

(22) Filed: Mar. 17, 2005

(65) Prior Publication Data

US 2006/0211430 A1    Sep. 21, 2006

(51) Int. Cl.
*H04B 1/38* (2006.01)
*H04W 24/00* (2009.01)
*G01S 13/08* (2006.01)
*G01S 1/00* (2006.01)
*G01S 13/58* (2006.01)

(52) U.S. Cl. .................. 455/574; 455/456.6; 455/456.1; 342/357.08; 342/357.12; 342/104; 342/109

(58) Field of Classification Search .............. 455/456.1, 455/456.5, 456.6, 574; 342/357.06, 357.01, 342/107, 114, 357.08, 357.1, 357.12, 104, 342/109, 457
See application file for complete search history.

(56) References Cited

U.S. PATENT DOCUMENTS

| | | | |
|---|---|---|---|
| 6,199,045 B1 | 3/2001 | Giniger et al. | |
| 6,559,794 B1 | 5/2003 | Nakajima et al. | |
| 2003/0050077 A1* | 3/2003 | Takeuchi et al. | 455/456 |
| 2003/0176196 A1* | 9/2003 | Hall et al. | 455/456.1 |
| 2004/0260458 A1* | 12/2004 | Park et al. | 701/200 |
| 2005/0054350 A1* | 3/2005 | Zegelin | 455/456.1 |
| 2005/0215269 A1* | 9/2005 | Cheok et al. | 455/456.1 |
| 2006/0121912 A1* | 6/2006 | Borjesson | 455/456.1 |

FOREIGN PATENT DOCUMENTS

| | | | |
|---|---|---|---|
| EP | 1132713 A1 | 9/2001 | |
| EP | 1484619 A2 | 12/2004 | |

OTHER PUBLICATIONS

Patent Abstracts of Japan vol. 1998, No. 13, Nov. 30, 1998 & JP 10 206520 A (Canon Inc), Aug. 7, 1998 Abstract.

(Continued)

*Primary Examiner*—George Eng
*Assistant Examiner*—Un C Cho
(74) *Attorney, Agent, or Firm*—Shyam K. Parekh

(57) ABSTRACT

A system and method in which the position update rate is adaptively modified, based on previous position measurements. By adjusting the update rate based on velocity predictions from two or more position fixes, a lower update rate may be used without exceeding the maximum error. Lowering the update rate reduces power consumption in the UE, providing longer battery operation. The updating method may comprise periodically repeating the velocity prediction and periodically adjusting the update rate responsive thereto. The update rate may be adjusted using additional information such as an acceleration prediction, a minimum update rate, or a preferred error. In some embodiments a model for user movement may be used to provide more accurate predictions, for example, stationary, walking, jogging, city driving, and freeway driving. The updating method may comprise receiving user input regarding the maximum position error.

31 Claims, 8 Drawing Sheets

OTHER PUBLICATIONS

International Search Report, PCT/US06/010082, International Search Authority, European Patent Office, Aug. 28, 2006.

Written Opinion, PCT/US06/010082, International Search Authority, European Patent Office, Aug. 28, 2006.

International Preliminary Report on Patentability, PCT/US06/010082, The International Bureau of WIPO, Geneva Switzerland, Sep. 18, 2007.

* cited by examiner

GPS POSITION TRACKING METHOD WITH VARIABLE UPDATING RATE FOR POWER CONSERVATION

BACKGROUND

1. Field of the Invention

This disclosure relates to position tracking systems that use wireless signals to determine the location of user equipment, such as GPS and A-GPS systems.

2. Related Art

Mobile communication devices (generally termed "user equipment" or "UE") have become an everyday part of modern life. Cell phones, particularly, have become ubiquitous, to such an extent that some people are foregoing conventional telephone service in favor of their cell phones.

In addition to their communication capabilities, some cell phones now have the capability of determining the position of the user equipment, taking advantage of satellite positioning systems (SPS) and/or the known location of cellular base stations. Specifically, cell phones may be required to have some positioning capabilities in order to facilitate emergency response to 911 calls; in addition, some cell phones can respond to a user request for determining position. Whatever the reason, the increasing importance of position location services has encouraged development of rapid, high sensitivity methods for acquiring the signals used to determine position.

Position location technologies typically utilize wireless positioning signals concurrently transmitted from known locations. In GPS systems, the positioning signals are concurrently transmitted from a multiplicity of satellites at a known time, with a predefined frequency. On the ground, a GPS receiver acquires a positioning signal from each satellite within its view of the sky. The times of arrival of the positioning signals along with the exact location of the in-view satellites and the exact times the signals were transmitted from each satellite are used to triangulate the position of the GPS receiver.

When a SPS fix is made, it gives the position at the time the GPS signals are received. If, however, the GPS receiver is moving, it may be desirable to regularly update position. For example, if a user has requested directions to a location, it may be desirable to monitor the position of the UE in order to accurately pinpoint its approximate current location, and thereby more accurately direct the user to the intended destination. In such a circumstance, it is desirable to monitor position of the UE in real time as much as possible.

In order to monitor position of the UE over a period of time, the UE can make a series of GPS position fixes. Typically these position fixes are performed at a fixed, predetermined update rate, which may for example be at the maximum possible rate (e.g., immediately after a position fix is completed, the next position fix begins). Unfortunately, updating at the maximum possible rate can consume system resources and slow operation of the UE. Furthermore, reducing power consumption is an important issue for those portable devices which carry a battery, and updating the GPS position at the maximum possible update rate can draw significant power, which will reduce time before recharging will be required. For example, if a battery can store 600 mAHr, and a continuously-updating position location system consumes 45 mA per hour, then the battery would be completely consumed in about thirteen hours by the position location system alone. However, if the fixed update rate were to be reduced substantially to save power, then the update rate may not be sufficient to accurately track position, especially if the user equipment is moving quickly.

Generally, because power consumption is an important issue for portable devices such as mobile phones, any reduction in power consumption can advantageously reduce drain on battery power, thereby extending battery life, allowing battery size to be reduced, or both. For a user, an extended battery life allows more calls and position locations to be made before recharging is required. If battery size is reduced, a portable device can be made smaller, more lightweight, and can be manufactured at a lower cost.

SUMMARY

A system and method is disclosed in which the position update rate is adaptively modified, based on previous position measurements. For example, if the user is moving slowly, the position update rate can be reduced, but if the user moving faster such as in a car, the update rate would be increased as more distance is being covered in a shorter period of time. By updating the position fix based on velocity calculated from two or more position fixes, the lowest possible update rate could be used. This reduces power consumed by an RF and BB digital receiver, thereby allowing longer application times for a given battery.

Particularly, a method is described for efficiently updating the position of mobile wireless user equipment (UE) to reduce the rate of energy consumption. The method includes establishing an update rate for determining position, which defines the time delay between subsequent measurements, and selecting a maximum error in position. A velocity prediction is made for the UE, including making a series of at least two position fixes at the update rate, estimating the distance between at least two of the position fixes, and determining the time difference between the two position fixes, and responsive to the time difference and the estimated distance, calculating the velocity prediction of the UE. The update rate is adjusted responsive to the velocity prediction, including reducing the update rate to reduce power consumption without exceeding the maximum error in position. The update rate may also be increased as appropriate to reduce the possibility that the maximum error will not be exceeded. A series of position fixes are made at the adjusted update rate, thereby efficiently utilizing energy stored in the UE. The updating method may comprise periodically repeating the velocity prediction and periodically adjusting the update rate responsive thereto.

The update rate may be adjusted using information in addition to a velocity prediction. For example the updating method may further comprise making an acceleration prediction, and adjusting the update rate responsive to the acceleration prediction. Also, the updating method may comprise establishing a minimum update rate, and adjusting the update rate so that it remains above or equal to the minimum update rate. The updating method may also comprise establishing a preferred error, and adjusting the update rate responsive to the preferred error.

In some embodiments a model for user movement may be used to provide more accurate predictions. For example the updating method may further comprise determining a model for user movement responsive to the series of position fixes, and adjusting the update rate responsive to the movement model and the velocity prediction. The movement model may, for example, comprise one of stationary, walking, jogging, city driving, and freeway driving.

The updating method may comprise receiving user input regarding the maximum position error, and determining the maximum position error responsive thereto. This user input may be provided, for example via a keypad or touch screen. The user input may be initiated by the user, such as by changing settings in the UE; alternatively, the user input may be received in response to a UE-initiated query.

BRIEF DESCRIPTION OF THE DRAWINGS

In the various figures of the drawing, like reference numbers represent the same or similar elements or parts.

DETAILED DESCRIPTION

Glossary of Terms and Acronyms

Figure 1:
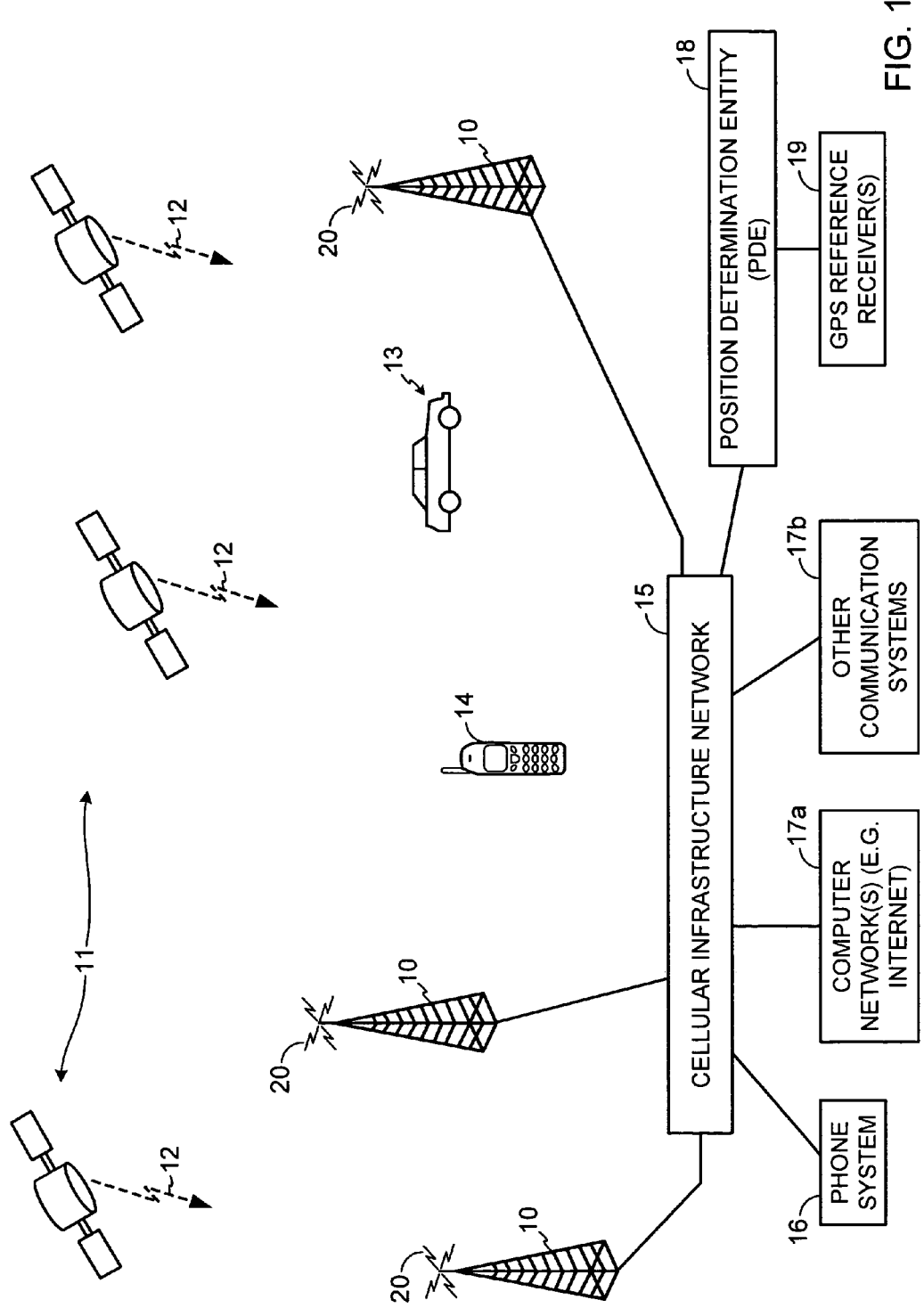
FIG. 1 illustrates a communication and position location system that includes satellites emitting GPS signals that are received by a GPS receiver in UE that is in communication with a plurality of base stations.

The following terms and acronyms are used herein:

A-GPS: Assisted GPS. A location technology in which assistance to a GPS acquisition process is provided by a location server to reduce acquisition time and improve sensitivity.

Base Station: Base Transceiver Station or BTS. A fixed station used for communicating with user equipment. Includes antennas for transmitting and receiving wireless communication signals.

BB: base band.

CDMA: Code Division Multiple Access.

DFT: Discrete Fourier Transform

GPS: Global Positioning System. A system of satellites around the Earth that broadcast radio signals from which positions can be determined. GPS typically refers to the U.S. Global Positioning System.

SPS: Satellite Positioning System. SPS is used generically to include GPS as well as other global positioning systems, such as the Russian Glonass System, the planned European Galileo System, and the like.

SPS fix: The end result of a process of measurements and subsequent computations by which the location of the SPS user is determined.

GSM: Global System for Mobile communication, another widely-used digital wireless technology.

mA: milliampere.

mAHr: milliampere-hour.

MS: Mobile Station, such as a cell phone that has a baseband modem for communicating with one or more base stations.

PCS: Personal Communication System.

PDE: Position Determination Entity. A system resource (e.g., a server) typically within the CDMA network, working in conjunction with one or more GPS reference receivers, capable of exchanging GPS-related information with UE. In a UE-Assisted A-GPS session, the PDE can send GPS assistance data to the UE to enhance the signal acquisition process. The UE can return information such as pseudorange measurements back to the PDE, which is then capable of computing the position of the UE. In a UE-Based A-GPS session, the UE can send computed position results to the PDE.

RF: radio frequency.

SV: satellite vehicle. One major element of the Global Positioning System is the set of SV's orbiting the Earth and broadcasting uniquely identifiable signals.

UE: User Equipment. Any type of wireless communications device used by a user. Includes cellular, cordless, Personal Communication System (PCS), or other types of wireless telephone devices, pagers, wireless personal digital assistants, notebook computers with wireless access, or any other wireless mobile device, two-way radios, walkie-talkies, or other type of communications transceiver, or mobile stations (MS), regardless of whether or not they have valid SIM or USIM identifiers. UEs of the type referenced in this disclosure typically include a GPS receiver.

Update Rate: As used herein, the update rate is the rate at which position location operations (position fixes) are performed. By its period, the update rate defines the time delay between position fixes.

A system is described herein in which the subsequent position of UE is predicted based upon information from two or more position location fixes. From this, the position update rate is adjusted to provide acceptable tracking with a reduced number of position fix updates, thereby reducing current requirements and prolonging battery life.

Below is an overview of a GPS system and mobile station in which this system can be implemented, and following that is a detailed description of the invention. For illustrative purposes, the embodiments herein are described in terms of the current U.S. GPS System. However, the principles and embodiments herein may be applied to a variety of SPS systems that utilize similar signaling formats, as well as to future variations of the U.S. GPS System.

Figure 2:
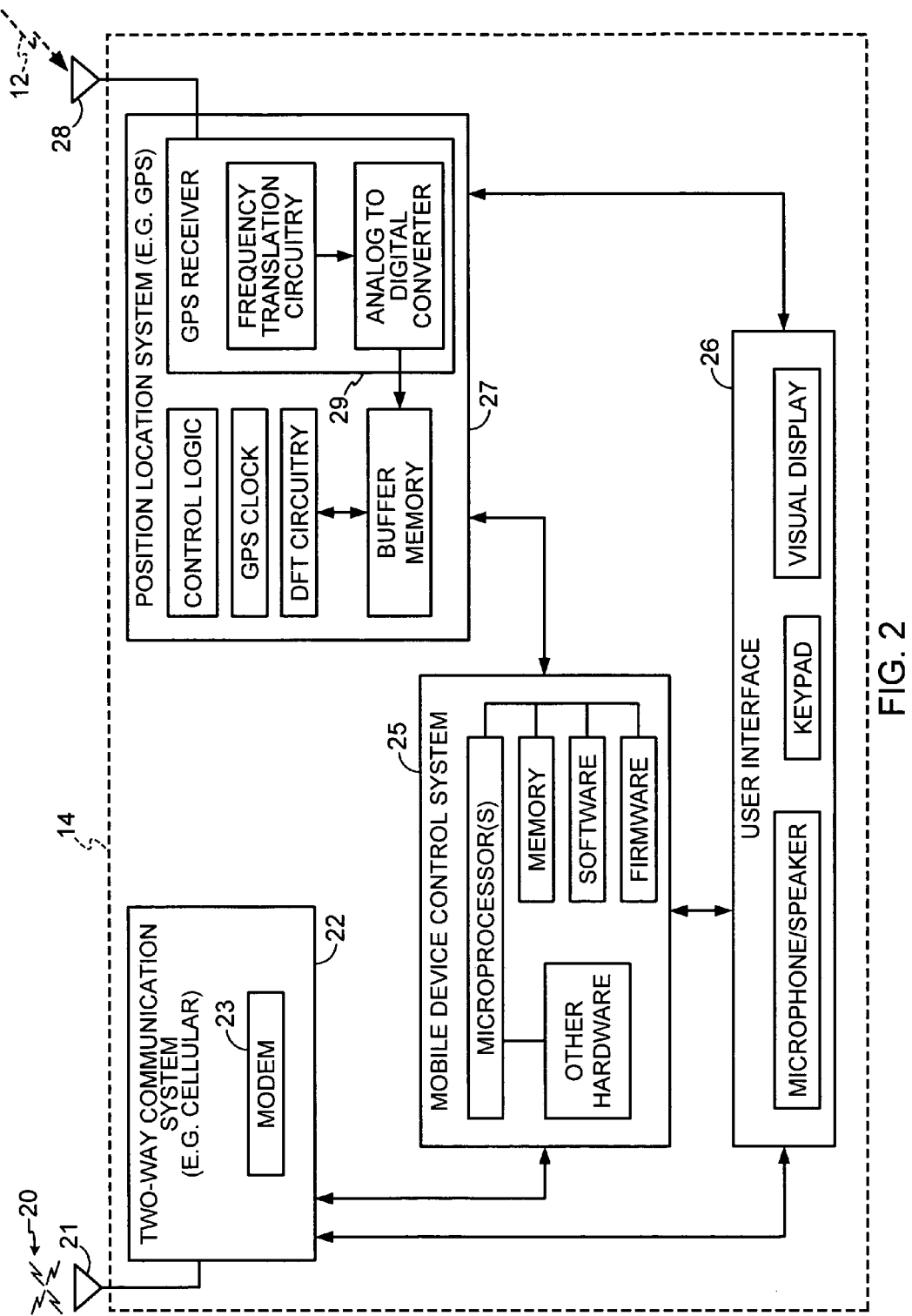
FIG. 2 is a block diagram of one UE embodiment, including a GPS receiver and a cellular communication system.

Reference is now made to FIGS. 1 and 2. FIG. 1 illustrates a GPS environment that includes a plurality of GPS satellites (SV's) 11 that emit GPS positioning signals 12, a plurality of land-based base stations 10, and user equipment (UE). The UE may be, for example, a cellular telephone 14, a vehicle 13, or the like. The base stations 10 are connected to a cellular infrastructure network 15, which allows it to communicate with other networks and communication systems, such as a phone system 16, computer networks 17*a*, such as the internet, and other communication systems 17*b*. The base stations 10 may comprise part of a communication network that may include a number of additional communication systems in communication with the base stations.

The UE 14 is described elsewhere herein, for example with reference to FIG. 2, but generally includes a GPS receiver and a two-way communication system for communication with the base stations using two-way communication signals 20. Although the embodiments described herein are primarily directed to cellular telephones or wireless communication devices, it should be apparent that the GPS receiver could be implemented in a wide variety of other types of UE that communicate with one or more base stations.

In FIG. 1, the UE 14 is illustrated as a hand-held device, although it may have any suitable implementation, such as a built-in device in a vehicle, such as an automobile 13. The UE 14 may be carried by a user who is standing, walking, traveling in a car, or on public transportation, for example. The UE 14 may be carried in the car 13 as it travels on its journey. It should be apparent that the user equipment may be positioned in a wide variety of environments, and may be stationary or moving.

The GPS satellites (SV's) 11 comprise any group of satellites broadcasting signals that are utilized for positioning a GPS receiver. Particularly, the satellites are synchronized to send wireless positioning signals 12 in phase with GPS time. These positioning signals are generated at a predetermined frequency and in a predetermined format. In a current GPS implementation, each SV transmits a civilian type of GPS signal on the L1-frequency band (at 1575.42 MHz) in a format that is in accordance with GPS standards.

When the GPS signals are detected by a conventional GPS receiver in the UE 14, the GPS system attempts to calculate the amount of time that has elapsed from transmission of the GPS signal until its reception at the UE. In other words, the GPS system calculates the time required for each of the GPS signals to travel from their respective satellites to the GPS receiver. The pseudo range is defined as: $c \cdot (T_{user} - T_{sv}) + cT_{bias}$, where c is the speed of light, $T_{user}$ is the GPS time when the signal from a given SV is received, $T_{sv}$ is the GPS time when the satellite transmitted the signal and $T_{bias}$ is an error in the local user's clock, normally present in the GPS receiver. Sometimes pseudorange is defined with the constant "c" omitted. In the general case, the receiver needs to resolve four unknowns: X, Y, Z (the coordinates of the receiver antenna), and $T_{bias}$. For this general case, resolving the four unknowns usually requires measurements from four different SV's; however, under certain circumstances, this constraint can be relaxed. For example, if an accurate altitude estimate is available, then the number of SV's required can be reduced from four to three. In so-called assisted GPS operation, $T_{sv}$ is not necessarily available to the receiver and instead of processing true pseudoranges, the receiver relies primarily upon code phases. In a current GPS implementation, the code phases have one-millisecond time ambiguities, since the PN codes repeat every one millisecond. Sometimes the data bit boundaries may be ascertained, thus producing only 20-millisecond ambiguities.

The base stations 10 comprise any collection of base stations utilized as part of a communication network that communicates with the UE 14 using wireless signals 20. The base stations are connected to the cellular infrastructure network 15, which provides communication services with a plurality of other communication networks, such as a public phone system 16, computer networks 17*a* such as the internet, a position determination entity (PDE) 18 (defined above), or a variety of other communication systems, shown collectively in block 17*b*. A GPS reference receiver (or receivers) 19, which may be in or near the base stations 10, or in any other suitable location, communicates with the PDE 18 to provide useful information in determining position, such as SV position, or ephemeris, data.

The ground-based cellular infrastructure network 15 typically provides communication services that allow the user of a cell phone to connect to another phone over the phone system 16; however, the base stations could also be utilized to communicate with other devices or for other communication purposes, such as an internet connection with a handheld personal digital assistant (PDA). The base stations 10 may be, for example, a part of a GSM communication network, a part of a synchronous (e.g., CDMA2000) or asynchronous communication network, or the like.

FIG. 2 is a block diagram of one embodiment of the mobile device 14, which includes communication and position location systems. A cellular communication system 22 is connected to an antenna 21 that communicates using the cellular signals 20. The cellular communication system 22 comprises suitable devices, such as a modem 23, hardware, and software for communicating with and detecting signals 20 from base stations, and processing transmitted or received information.

A GPS position location system 27 in the UE is connected to a GPS antenna 28 to receive positioning signals 12 that are transmitted at or near the ideal GPS (carrier) frequency. The GPS system 27 comprises a GPS receiver 29 that includes frequency translation circuitry and an analog-to-digital converter, a GPS clock, control logic to control the desired functions of the GPS receiver, and suitable hardware and software for receiving and processing GPS signals and for performing any calculations necessary to determine position using a suitable position location algorithm.

In the illustrated embodiment, the analog to digital converter is connected to the buffer memory in the position location system, and a buffer memory is coupled to the DFT circuitry to provide and store the data during the DFT operation. In some assisted GPS implementations the final position location calculations (e.g., latitude and longitude) are performed at a remote server such as the position determination entity (PDE), based upon code phases and other information sent from the GPS receiver to the remote server. Some examples of GPS systems are disclosed in U.S. Pat. Nos. 5,841,396; 6,002,363; and 6,421,002; by Norman F. Krasner.

A mobile device control system 25 is connected to both the two-way communication system 22 and the position location system 27. The mobile device control system 25 includes any appropriate structure, such as one or more microprocessors, memory, other hardware, firmware, and software to provide appropriate control functions for the systems to which it is connected. It should be apparent that the processing steps described herein are implemented in any suitable manner using hardware, software, or firmware, subject to control by the microprocessor.

The control system 25 is also connected to a user interface 26, which includes suitable components to interface with the user, such as a keypad, a microphone/speaker for voice communication services, a display, for example, a backlit LCD display, or the like. The mobile device control system 25 and user interface 26, connected to the position location system 27 and two-way communication system 22, provide suitable input-output functions for the GPS receiver and the two-way communication system, such as controlling user input and displaying results.

Figure 3:
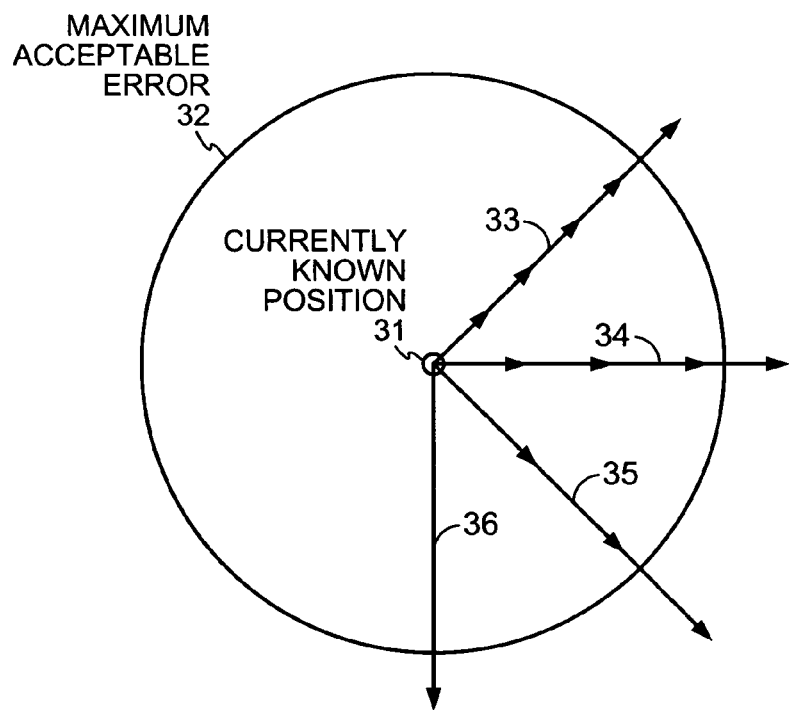
FIG. 3 is a diagram illustrating the known position of the UE, the maximum error in position, and the movement of the UE resulting from different velocity assumptions, assuming that the UE will be traveling in a straight line at a constant velocity.
Figure 4:
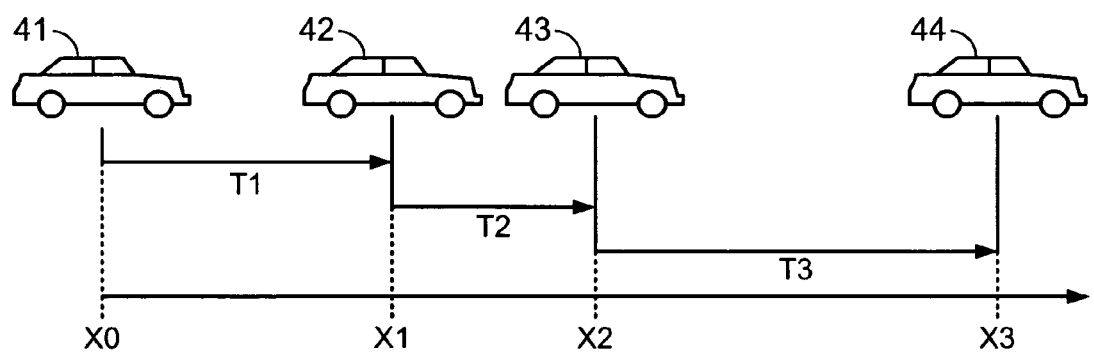
FIG. 4 is a diagram of an automobile in motion from left to right, showing the position of the automobile at a series of four positions.
Figure 5:
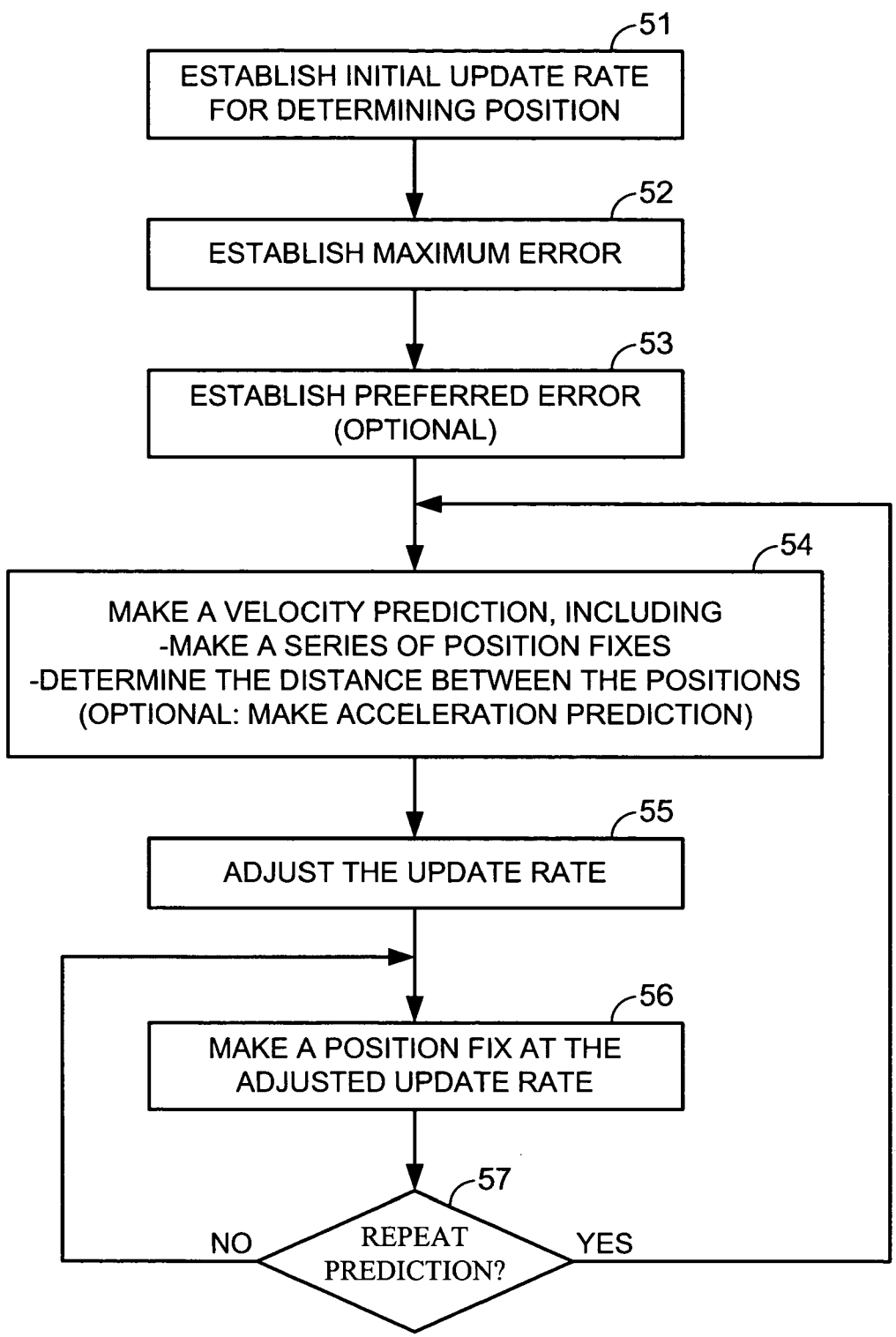
FIG. 5 is a flowchart of operations that include adjusting the update rate to efficiently update the UE's position.

Reference is now made to FIGS. 3, 4, and 5 in which one system is described in which the subsequent position of the UE is predicted based upon information from two or more position location fixes. From this, the position update rate is adjusted to provide acceptable tracking with a reduced number of position fix updates, thereby reducing current requirements and prolonging battery life.

FIG. 3 is a diagram illustrating the currently known position of the UE 31, the maximum acceptable error in position 32, and the movements 33-36 of the UE resulting from different velocity assumptions, assuming that the UE will be traveling in a straight line at a constant velocity for purposes of simplicity of description. In FIG. 3, the currently known position of the UE is shown at 31 in the center of an error circle 32, which defines the maximum acceptable error in position. The maximum error is determined in any suitable manner. For example, the maximum error may be predetermined, it may depend upon location, it may be selected by user input, any combination of these, or the like.

As can be seen in FIG. 3, any movement of the UE in a straight line moves away from its known position, and toward the maximum error 32 at a rate determined by the velocity of the UE. Several examples are shown as lines 33-36 emanating from the center, each line representing the positional movement of the UE at different velocity. Each line 33-36 includes a number of vectors, each vector indicating the distance that the UE will travel in one time unit (tu). At the first positional line 33, which assumes a first velocity, approximately four and one-half time units (4.5 tu) will elapse before the maximum error is reached. At the second positional line 34, which assumes a second, faster velocity, approximately three and one-half time units (3.5 tu) will elapse before the maximum error is reached. At the third positional line 35, which assumes a third, still faster velocity, approximately two and one-quarter time units (2.25 tu) will elapse before the maximum error is reached. At the fourth positional line 36, which assumes a fourth, much faster velocity, less than one time unit, approximately four-fifths of a time unit (0.8 tu), will elapse before the maximum error is reached.

Conventionally, the update rate is fixed. If we assume that each time unit, tu, represents one period of a fixed update rate, then from FIG. 3, it can be seen that this particular fixed update rate will provide acceptable information for the first, second, and third velocity assumptions (shown at 33, 34, and 35), but at the expense of the power loss resulting from an unnecessary number of position fixes. However, for the fourth velocity assumption (shown at 36), the fixed rate is not adequate, because the UE has traveled beyond the boundaries defined by the maximum error.

FIG. 4 is a diagram of an automobile in motion from left to right, showing the position of the automobile at a series of four positions 41, 42, 43, and 44. The distances (X0, X1, X2, and X3) correspond to these position fixes, and the time elapsed between these position fixes is shown as T1, T2, and T3. FIG. 4 is used to illustrate how a velocity prediction can be made based upon at least two of these position fixes, and the time difference between when these position fixes were made. It may be noticed that FIG. 4 is a simplified, one-dimensional view of movement, and is provided for purposes of illustration. A more complex model is described hereinbelow.

The velocity prediction can be made in many different ways. One straightforward method is to take the distance between two position measurements, and divide that distance by the time necessary to cross that distance. For example, the distance from X0 to X1 can be divided by the time T1 to get a velocity prediction for the subsequent time period. As another example, the distance from X0 to X2 can be divided by the sum of T1 and T2 to get a velocity prediction for a subsequent time period. As another example, velocity estimates over two or more periods may be averaged to arrive at the next velocity prediction.

If desired, an acceleration prediction may be made in addition to the velocity prediction. For example, the acceleration prediction may be calculated responsive to changes in velocity over a series of measurements, such as an average over a number of measurements, such as the most recent three, five, ten, or other number of measurements. Depending upon the application, a greater weight may be given to the most recent changes in velocity, upon the assumption that the acceleration at the present moment is likely to be most closely related to the acceleration in the most recent moment.

FIG. 5 is a flowchart of operations to efficiently update the position of mobile wireless user equipment (UE), while reducing the rate of energy consumption. As used herein, the update rate is the rate at which position location operations (position fixes) are performed. By its period, the update rate defines the time delay between position fixes.

At 51, an initial update rate for determining position is established. This initial update rate is determined in any suitable way. For example the initial update rate may be predetermined, it may be at the maximum possible rate, it may relate to the most recent update rate used by the particular UE, or it may relate to another suitable technique.

At 52, a maximum error in position is established. This maximum error is discussed above with reference to FIG. 3 and may be selected in any suitable matter. For example, the maximum error may be predetermined, it may depend upon location, it may be selected by user input, or combination of thereof.

Figure 6:
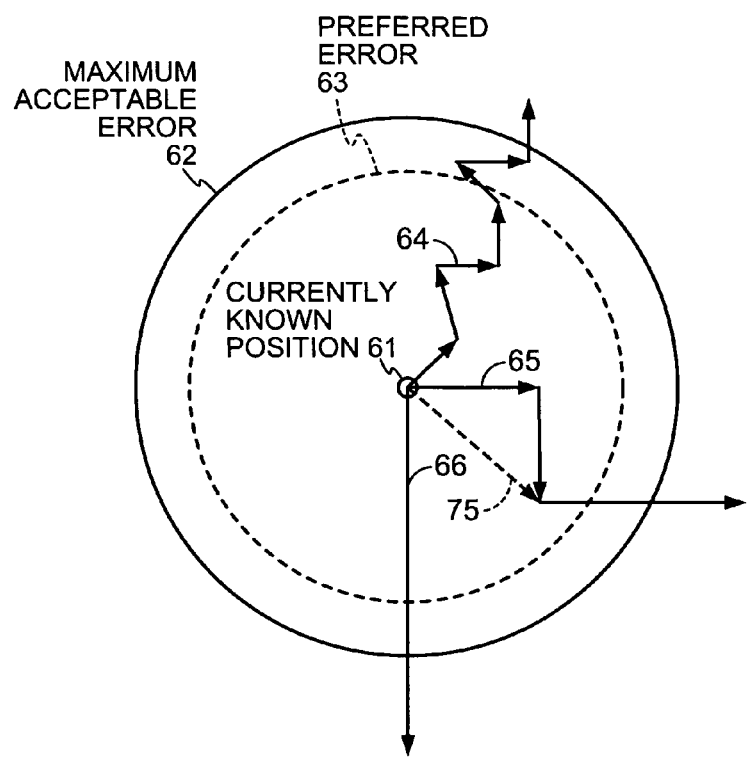
FIG. 6 is a diagram illustrating a known position of the UE, the maximum error in position, the preferred error in position, and the path of the UE in three different examples in which the UE is not traveling in a straight line and has a velocity that varies over time.

At 53, a preferred error may be established. The preferred error may be established with consideration of user preferences and target power consumption. An example of a preferred error is shown in FIG. 6 and appears as a concentric circle 63 within the maximum error circle 62.

At 54, a velocity prediction for the UE is established. The velocity prediction is described in more detail in conjunction with FIG. 4. In FIG. 5, for illustration purposes, the steps shown include making a series of at least two position fixes at the update rate and estimating the distance between at least two of the position fixes. Thus, the velocity prediction of the UE may be calculated responsive to the calculated time delay and the estimated travel distance.

In some embodiments, an acceleration prediction may be made in addition to the velocity prediction. For example, the acceleration prediction may be calculated responsive to changes in velocity over a series of measurements, such as an average over the last four measurements. A greater weight may be given to the most recent changes in velocity.

At 55, responsive to the velocity prediction and the maximum error in position, and possibly also to the acceleration prediction, the update rate is adjusted to reduce power consumption while still providing the maximum error in position. More particularly, adjusting the update rate includes reducing the update rate to reduce power consumption without exceeding the maximum error in position. This may also include increasing the update rate as appropriate to stay within a predetermined range from the maximum allowable error.

For example, at a higher velocity, the update rate is adjusted to increase the number of measurements to follow the faster rate of change of position in order to provide the same maximum error. Conversely, at a slower velocity, the update rate can be reduced to conserve power while still providing the same maximum error. The predicted velocity may be used directly. One example might be to simply assume that the UE will travel approximately at the predicted velocity and then adjust the update rate accordingly. However, a more conservative approach would be to adjust the update rate to some fraction of the velocity in order to account for the possibility that the UE may speed up. For example, the update rate may be adjusted assuming that the UE will travel at twice the predicted velocity in order to make it more likely that the maximum error will not be exceeded.

In addition to the velocity prediction and the maximum error, a number of factors may be considered when adjusting the update rate. For example, the preferred error (discussed with respect to block 53, supra) may be useful to adjust the update rate. Furthermore, a floor, or minimum, update rate may be implemented to avoid adjusting the update rate to too low a level; for example, if the UE is temporarily stopped, such as at a traffic light, or moving relatively slowly. The floor, or minimum, update rate may be established in any suitable way.

In addition, the accuracy of GPS measurements may be considered when adjusting the update rate. For example, a less accurate GPS measurement may require a higher update rate in order to maintain the same maximum error. Conversely a more accurate GPS measurement may advantageously allow a lower update rate.

At 56, a position fix is made at the adjusted update rate, thereby efficiently utilizing energy stored in the UE.

At 57, a decision is made as to whether or not to repeat the prediction(s), such as the velocity prediction, with more recent position information and the adjusted update rate. This decision may be based upon any of a number of factors. A simple approach would be to periodically repeat the velocity prediction after a specified lapse of time or a certain number of position fixes. Another approach is to take into account the observed changes of velocity over a number of previous position fixes, and repeat the velocity prediction accordingly. Thus, if the observed changes are significant, then the velocity prediction should be repeated more often, but if the observed changes are not significant, then the velocity prediction may be repeated less frequently.

Figure 7:
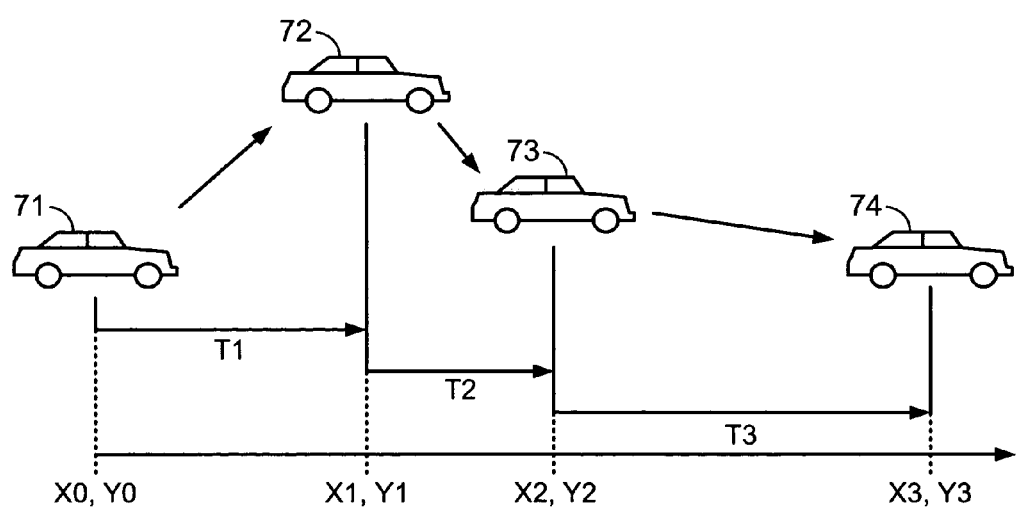
FIG. 7 is a diagram of an automobile in motion from left to right, showing the position of the automobile at a series of four positions.
Figure 8:
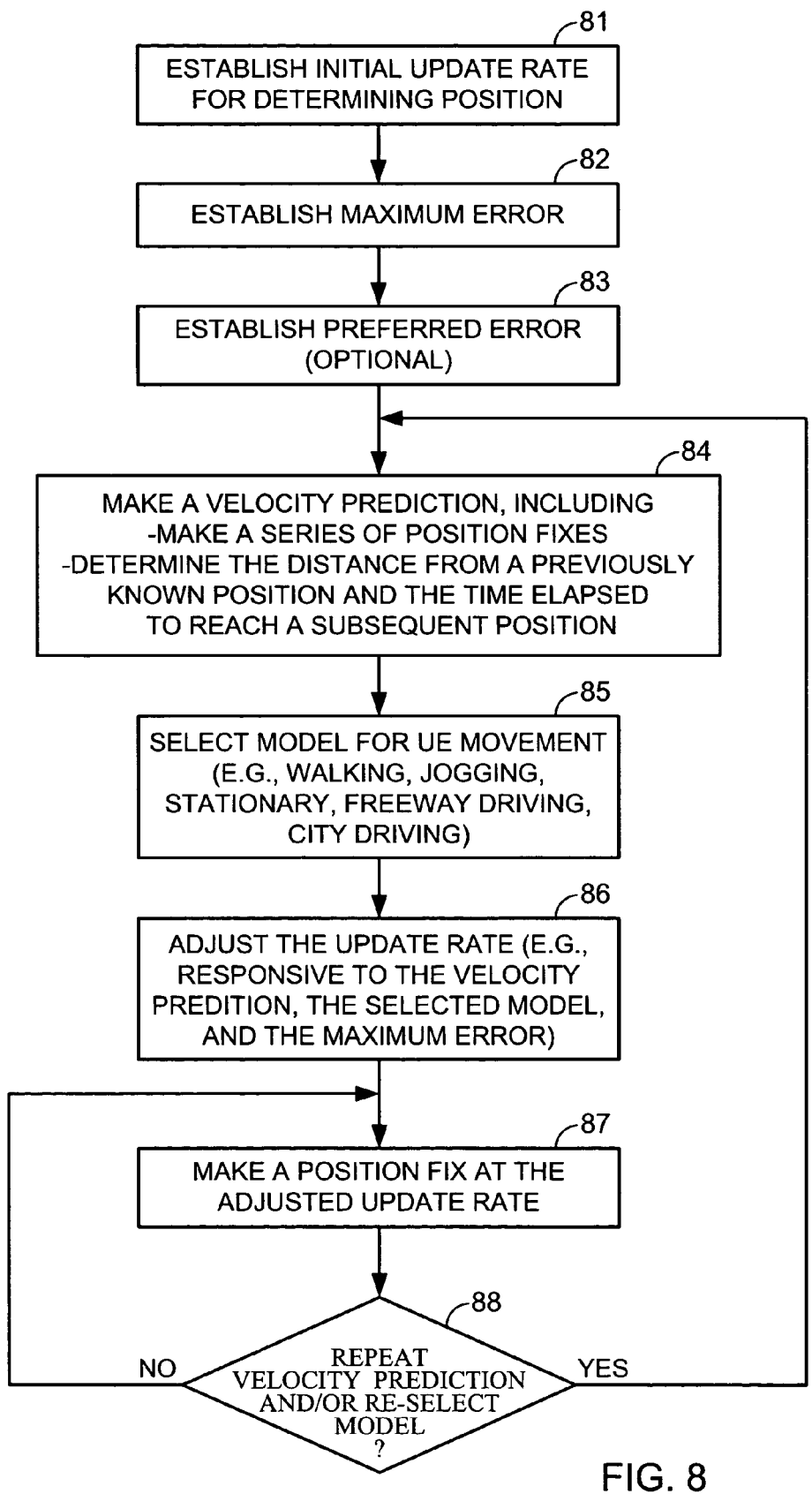
FIG. 8 is a flowchart of operations to efficiently update the position of UE that includes selection of a model for user movement and its use in adjusting the update rate.

Reference is now made to FIGS. 6, 7, and 8 to describe a more complex system in which the subsequent position of the UE is predicted based upon information from two or more position location fixes. In order to assist in making a more accurate prediction of position, a model is selected that approximately matches the movement (for example, walking, jogging, stationary, freeway driving, and stop-and-go city driving) of the UE over a number of recent position fixes. Using this user movement model, the position update rate is adjusted to provide more accurate position tracking with a reduced number of position fix updates, thereby reducing current requirements and prolonging battery life.

FIG. 6 is a diagram illustrating a known position of the UL 61 the maximum error in position 62, the preferred error in position 63 and the path of the UL in three different examples 64-66. The FIG. 6 embodiment assumes a "real world" situation in which the UL may not be traveling in a straight line, and may have a velocity that varies over time. In FIG. 6, the known position of the UL is shown at 61 in the center of an error circle 62. The circle 62 defines the maximum acceptable error in position.

The maximum error is determined in any suitable manner. For example, the maximum error may be predetermined, it may depend upon location, it may be selected by user input, it may be selected in another suitable manner, or combination of thereof. In addition, FIG. 6 shows a "preferred error" in the form of a circle around the known position. The preferred error may be established with consideration of user preferences and target power consumption.

Three example paths are shown in FIG. 6, each representing one type of movement. Each path is shown as a group of connected vectors emanating from the center. Each vector indicates the distance that the UE travels in one time unit (tu). It may be noted that many variations of movement are possible, and a movement model can be developed for each. These three examples are provided only for purposes of illustration.

As can be seen from the examples of FIG. 6, the paths of the UE are usually in a direction away from its known position, although this does not always have to be true. For example, the UE may move back towards its previous position.

At a first path 64, the UE zigzags away from the center known position, as if the UE is driving or walking on city streets. Eventually the path 63 arrives at the maximum error 62, but only after about 7.2 time units (7.2 tu). This type of path can define a city driving model.

At a second path 65, the UE travels at a greater velocity than in the first path 64, and therefore travels a greater distance between turns. This type of path can define a suburban, or rural driving model.

At a third path 66, the UE travels in an approximately straight line at a greater velocity than the first or second paths. This type of path can define a freeway driving model.

FIG. 7 is a diagram of an automobile in motion from left to right, showing the position of the automobile at a series of four positions 71, 72, 73, and 74. A corresponding fix is made at each of these positions at (X0, Y0; X1, Y1; X2, Y2; and X3, Y3), and time elapsed between these position fixes (T1, T2, and T3). FIG. 7 is used to illustrate how a position prediction can be made based upon at least two of these position fixes and the time difference between when these position fixes were made.

In comparison with FIG. 4, FIG. 7 is a two-dimensional view of movement that provides a more complex model than one-dimensional movement shown in FIG. 4; however, even a two-dimensional view is simplified from the three-dimensional movement of a real UE. Therefore, it should be clear that FIG. 7 is provided for purposes of illustration.

In the context of FIGS. 6 and 7, the velocity prediction is not necessarily the instantaneous velocity. Instead it is the velocity from a recent known position (shown in the center in FIG. 6), since it is the distance from the recent known position that is relevant to determining the update rate to stay within the maximum error. Determining the velocity prediction from the center known position can be made in many different ways. One straightforward method is to take the direct distance from the center, and divide that distance by the time necessary to cross that distance. For example, in FIG. 7, the first and fourth positions are the same distance from the y-axis, and therefore define a direct line from the center. Accordingly, the distance from X0 to Y0 to X3 to Y3 can be divided by the sum of the times T1, T2 and T3 to get a velocity prediction for the subsequent time period. As another example, in FIG. 6 a vector 75 shows the distance from the center known position to the actual position after two time periods. This distance can be divided by two to give the velocity from center.

FIG. 8 is a flowchart of operations to efficiently update the position of mobile wireless user equipment (UE), while reducing the rate of energy consumption. At 81, an initial update rate for determining position is established. This initial update rate is determined in any suitable way, for example it may be predetermined, it may be at the maximum possible rate, or it may relate to the most recent update rate used by the particular UE.

At 82, a maximum error in position is established. This maximum error is discussed above with reference to FIGS. 3 and 6, for example. The maximum error may be predetermined, depend upon location, be selected by user input, selected in any suitable manner, or any combination of these.

At 83, a preferred error may be established as discussed with reference to 63 in FIG. 6.

At 84, making a velocity prediction from a previously known position of the UE is shown. The velocity prediction is described in more detail with reference to FIGS. 6 and 7. In FIG. 8, for illustration purposes, the steps shown include making a series of at least two position fixes at the update rate, and estimating the distance from center to the endpoint of the latest position fix. Responsive to the elapsed time and the distance from the center, a velocity prediction of the UE is calculated.

In some embodiments, an acceleration prediction may be made in addition to the velocity. For example, the acceleration prediction may be calculated responsive to changes in velocity over a series of measurements, such as an average over the last four measurements. A greater weight may be given to the most recent changes in velocity.

At 85, the path is examined to select an appropriate model for movement of the UE. For example if the path resembles the first path 64, then the model of city driving is selected, if the path resembles the second path 65, then the model of suburban driving selected, and if the path resembles the third path 66, then the model of freeway driving is selected.

At 86, the update rate is adjusted in response to the velocity prediction, the selected model, and the maximum error in position. Adjusting the update rate includes reducing the update rate to reduce power consumption, without exceeding the maximum error in position. Adjusting the update rate also includes increasing the update rate as appropriate to stay within a predetermined range from the maximum allowable error. For example, at a higher velocity, the update rate may be adjusted to increase the number of measurements to follow the faster rate of change of position in order to provide the same maximum error. Conversely, at a slower velocity, the update rate can be reduced to conserve power while still providing the same maximum error.

The predicted velocity may be used directly. One example is to simply assume that the UE will travel approximately at the predicted velocity, and then adjust the update rate accordingly. However, a more conservative approach is to adjust the update rate to some fraction of the velocity in order to account for the possibility that the UE may speed up. For example, the update rate may be adjusted, assuming that the UE will travel at twice the predicted velocity, in order to make it more likely that the maximum error will not be exceeded.

In addition to the velocity prediction and the maximum error, a number of factors may be considered when adjusting the update rate. For example, the acceleration prediction or the preferred error may be useful to adjust the update rate. Furthermore, a floor, or minimum, update rate may be implemented to avoid adjusting the update rate too low. The floor, or minimum, update rate may be established in any suitable way to avoid adjusting the update rate too low, for example, if the UE is temporarily stopped, such as at a traffic light, or moving relatively slowly.

At 87, a position fix is made at the adjusted update rate, thereby efficiently utilizing energy stored in the UE.

At 88, a decision is made as to whether or not to repeat the velocity prediction or to reselect the model, using more recent position information and the adjusted update rate. This decision may be based upon any of a number of factors and methodologies. A simple approach is periodical. For example, the velocity prediction may periodically repeat after a specified lapse of time or a certain number of position fixes. Another approach is to take into account the observed changes of velocity over a number of previous position fixes, and repeat the velocity prediction accordingly. For example, if the observed changes are significant, then the velocity prediction should be repeated more often, but if the observed changes are not significant, then the velocity prediction repeated less frequently.

Figure 9:
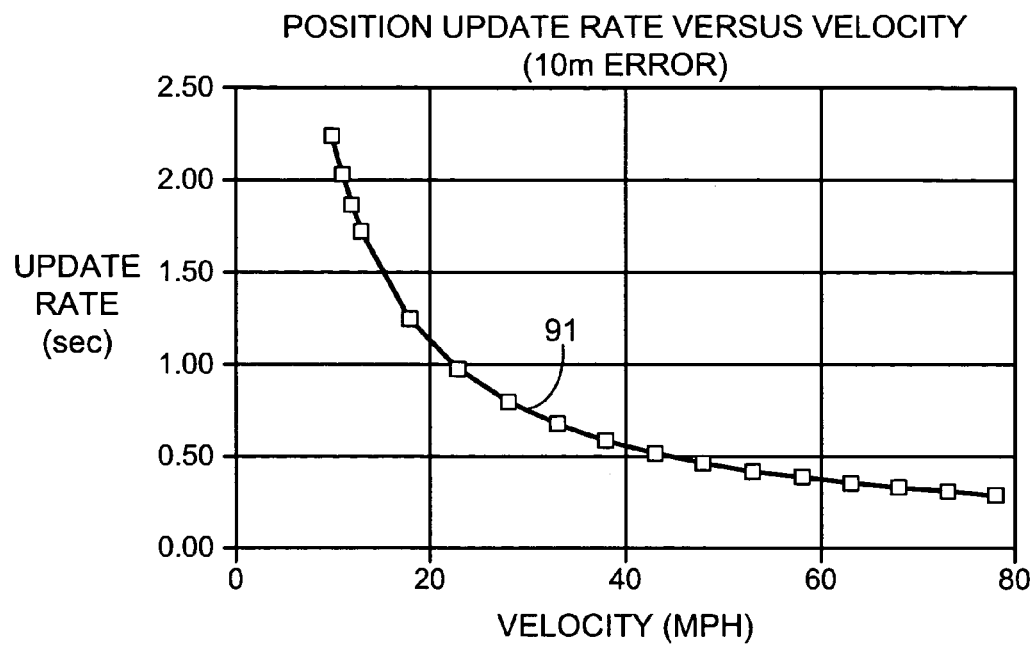
FIG. 9 is a graph showing a relationship between update rate and velocity to maintain a maximum error of about 10 m.
Figure 10:
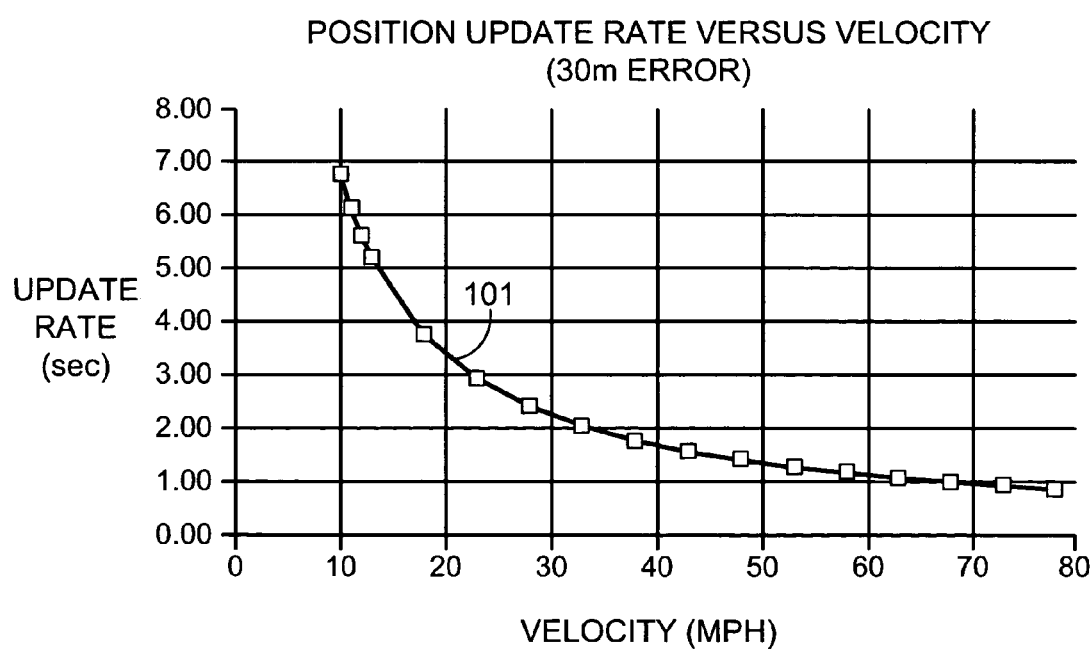
FIG. 10 is a graph showing a relationship between update rate and velocity to maintain a maximum error of about 30 m.

FIGS. 9 and 10 are graphs that show examples of one way in which the update rate can be adjusted responsive to the predicted velocity to maintain a maximum error and reduce power consumption. In FIG. 9, a plot line 91 shows a graph of the seconds/update (the period between updates) as a function of predicted velocity, for a maximum error of 10 m. In FIG. 10 a plot line 101 shows a graph of the seconds/update as a function of predicted velocity, for a maximum error of 30 m.

The following Table 1 sets forth the data and information used to create the graph lines shown in FIGS. 9 and 10. In the following Table 1, the third and fourth columns show the update as "seconds/update" (i.e., the period). It should be clear that the update rate can be obtained straightforwardly from this value by taking the inverse.

TABLE 1 update adjustment example

| Speed (mph) | Distance traveled in 1 sec (ft) | Seconds/update (10 m max error) (91, FIG. 9) | Seconds/update (30 m max error) (101, FIG. 10) |
|---|---|---|---|
| 1 | 1.47 | 22.39 | 67.16 |
| 10 | 14.67 | 2.24 | 6.72 |
| 11 | 16.13 | 2.04 | 6.11 |
| 12 | 17.60 | 1.87 | 5.60 |
| 13 | 19.07 | 1.72 | 5.17 |
| 18 | 26.40 | 1.24 | 3.73 |
| 23 | 33.73 | 0.97 | 2.92 |
| 28 | 41.07 | 0.80 | 2.40 |
| 33 | 48.40 | 0.68 | 2.04 |
| 38 | 55.73 | 0.59 | 1.77 |
| 43 | 63.07 | 0.52 | 1.56 |
| 48 | 70.40 | 0.47 | 1.40 |
| 53 | 77.73 | 0.42 | 1.27 |
| 58 | 85.07 | 0.39 | 1.16 |
| 63 | 92.40 | 0.36 | 1.07 |
| 68 | 99.73 | 0.33 | 0.99 |
| 73 | 107.07 | 0.31 | 0.92 |
| 78 | 114.40 | 0.29 | 0.86 |

As can be seen, the velocity is inversely related to the time between updates. A higher predicted velocity requires more frequent updates.

Figure 11:
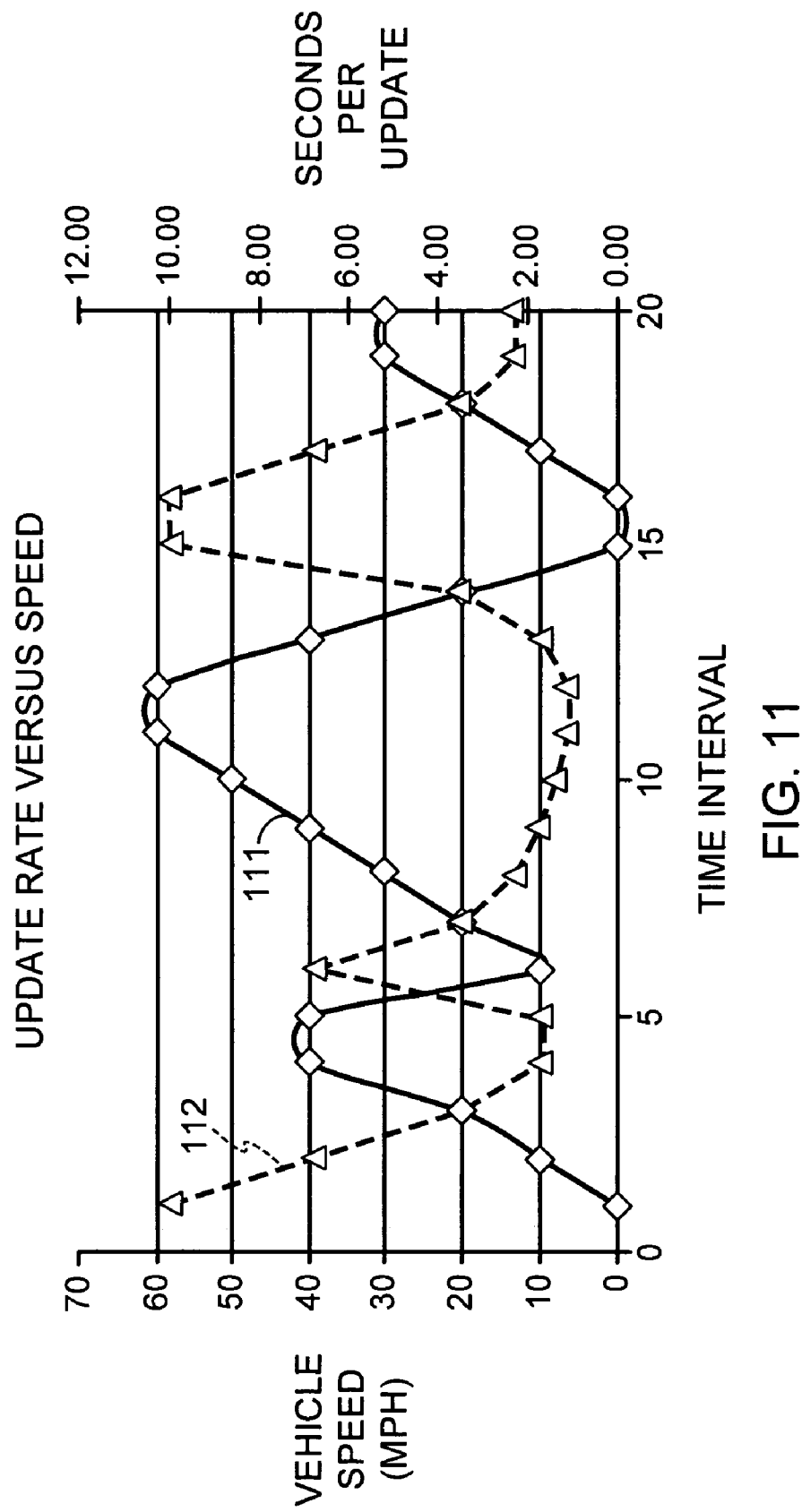
FIG. 11 is a graph showing relationships between vehicle speed, time between updates, and time interval, as an example of UE movement in which the update rate is adjusted adaptively as described herein, using a 30 m maximum error.

FIG. 11 is an example of adjusting the update rate adaptively, using a 30 m maximum error as an example. In FIG. 11, the predicted velocity is plotted as a solid line 111 (in units of mph), and the time/update is plotted as a dashed line 112 (in units of seconds/update). The data and calculations for this example are shown in the table below, for each successive position location determination shown in column 1. Note that the maximum number of seconds per update (at zero mph) is set at ten seconds in this example.

TABLE 2

Example of adaptively adjusting the update rate

| Position number | Speed (mph) | Distance traveled in 1 sec (ft) | Seconds per update |
|---|---|---|---|
| 1 | 0 | 0.00 | 10.00 |
| 2 | 10 | 14.67 | 6.72 |
| 3 | 20 | 29.33 | 3.36 |
| 4 | 40 | 58.67 | 1.68 |
| 5 | 40 | 58.67 | 1.68 |
| 6 | 10 | 14.67 | 6.72 |
| 7 | 20 | 29.33 | 3.36 |
| 8 | 30 | 44.00 | 2.24 |
| 9 | 40 | 58.67 | 1.68 |
| 10 | 50 | 73.33 | 1.34 |
| 11 | 60 | 88.00 | 1.12 |
| 12 | 60 | 88.00 | 1.12 |
| 13 | 40 | 58.67 | 1.68 |
| 14 | 20 | 29.33 | 3.36 |
| 15 | 0 | 0.00 | 10.00 |
| 16 | 0 | 0.00 | 10.00 |
| 17 | 10 | 14.67 | 6.72 |
| 18 | 20 | 29.33 | 3.36 |
| 19 | 30 | 44.00 | 2.24 |
| 20 | 30 | 44.00 | 2.24 |

Therefore it can be seen how the update rate can be adjusted to adapt to the predicted velocity of the UE.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

The invention claimed is:

1. A method for efficiently updating the position of mobile wireless user equipment (UE) to reduce the rate of energy consumption, comprising:
   establishing an update rate for determining position;
   selecting a maximum error in position;
   making a velocity prediction for said UE;
   adjusting said update rate responsive to said velocity prediction and said maximum error in position; and
   making a series of position fixes at said adjusted update rate.

2. The method of claim 1 further comprising periodically repeating said velocity prediction and periodically adjusting said update rate responsive thereto.

3. The method of claim 1 further comprising making an acceleration prediction, and adjusting said update rate responsive to said acceleration prediction.

4. The method of claim 1 further comprising establishing a minimum update rate, and adjusting said update rate so that it remains above or equal to said minimum update rate.

5. The method of claim 1 further comprising determining a model for user movement responsive to said series of position fixes, and further adjusting said update rate responsive to said movement model and said velocity prediction.

6. The method of claim 5 wherein said movement model comprises stationary, walking, jogging, city driving, and freeway driving.

7. The method of claim 1 further comprising establishing a preferred error, and adjusting said update rate responsive to said preferred error and said maximum error.

8. The method of claim 1 further comprising receiving user input regarding said maximum position error.

9. The method of claim 1 wherein the step of making the velocity prediction for said UE comprises:
   making a series of at least two position fixes at said update rate;
   estimating a distance between at least two of said position fixes;
   determining a time difference between the two position fixes; and
   responsive to said time difference and said estimated distance, calculating said velocity prediction of said UE.

10. The method of claim 1 wherein the step of adjusting said update rate responsive to said velocity prediction comprises reducing said update rate to reduce power consumption without exceeding said maximum error in position.

11. The method of claim 1 wherein the step of adjusting said update rate responsive to said velocity prediction comprises increasing said update rate to follow a faster predicted velocity without exceeding said maximum error in position.

12. A method for efficiently updating the position of mobile wireless user equipment (UE) to reduce energy consumption while still providing accurate position information over time, comprising:
   making a velocity prediction for said UE, including:
      making a first position fix at a first time;
      making a second position fix at a second time;
      calculating a time delay between the first and second position fixes;
      estimating a travel distance between said first and second position fixes; and
      responsive to said calculated time delay and said estimated travel distance, calculating an actual velocity and making a velocity prediction of said UE over a next time period;
   adjusting the time delay for a next position fix responsive to said velocity prediction and a maximum error in position; and
   making a third position fix responsive to said time delay to update the position of said UE at a third time subsequent to said second time.

13. The method of claim 12 wherein said step of making a velocity prediction comprises sequentially making a plurality of position fixes, and responsive to said plurality of position fixes and time said position fixes were taken, calculating a velocity prediction.

14. The method of claim 12 wherein said step of making a velocity prediction comprises averaging at least three previous position fixes.

15. The method of claim 12 further comprising establishing a minimum time delay between subsequent position fixes, and adjusting the time delay so that it remains above or equal to said minimum time delay.

16. The method of claim 12 further comprising determining a maximum position error, providing a predetermined GPS accuracy, and calculating said time delay responsive to said position error, said velocity prediction and said predetermined GPS accuracy.

17. The method of claim 16 further comprising receiving user input regarding said maximum position error.

18. The method of claim 12 further comprising selecting a user movement model responsive to said velocity prediction, and adjusting said time delay responsive to said selected model.

19. The method of claim 18 wherein said movement model comprises stationary, walking, jogging, city driving, and freeway driving.

20. The method of claim 12 further comprising selecting a maximum error in position.

21. A system for efficiently updating the position of mobile wireless user equipment (UE) to reduce the rate of energy consumption, comprising:
- means for establishing an update rate for determining position;
- means for selecting a maximum error in position;
- means for making a velocity prediction for said UE;
- means for adjusting said update rate responsive to said velocity prediction and said maximum error in position; and
- means for making a series of position fixes at said adjusted update rate.

22. The system of claim 21 further comprising means for periodically repeating said velocity prediction and means for periodically adjusting said update rate responsive thereto.

23. The system of claim 21 further comprising means for making an acceleration prediction, and means for adjusting said update rate responsive to said acceleration prediction.

24. The system of claim 21 further means for comprising establishing a minimum update rate, and means for adjusting said update rate so that it remains above or equal to said minimum update rate.

25. The system of claim 21 further comprising means for determining a movement model for user movement responsive to said series of position fixes, and means for adjusting said update rate responsive to said movement model and said velocity prediction.

26. The system of claim 25 wherein said movement model comprises stationary, walking, jogging, city driving, and freeway driving.

27. The system of claim 21 further comprising means for establishing a preferred error, and adjusting said update rate responsive to said preferred error and said maximum error.

28. The system of claim 21 further comprising means for receiving user input regarding said maximum position error.

29. The system of claim 21 wherein the means for making the velocity prediction comprises:
- means for making a series of at least two position fixes at said update rate;
- means for estimating the distance between at least two of said position fixes;
- means for determining the time difference between the two position fixes; and
- means, responsive to said time difference and said estimated distance, for calculating said velocity prediction of said UE.

30. The system of claim 21 wherein the means for adjusting said update rate responsive to said velocity prediction comprises means for reducing said update rate to reduce power consumption without exceeding said maximum error in position.

31. The system of claim 21 wherein the means for adjusting said update rate responsive to said velocity prediction comprises means for increasing said update rate to follow a faster predicted velocity without exceeding said maximum error in position.

* * * * *